United States Patent Office 3,304,489
Patented Feb. 14, 1967

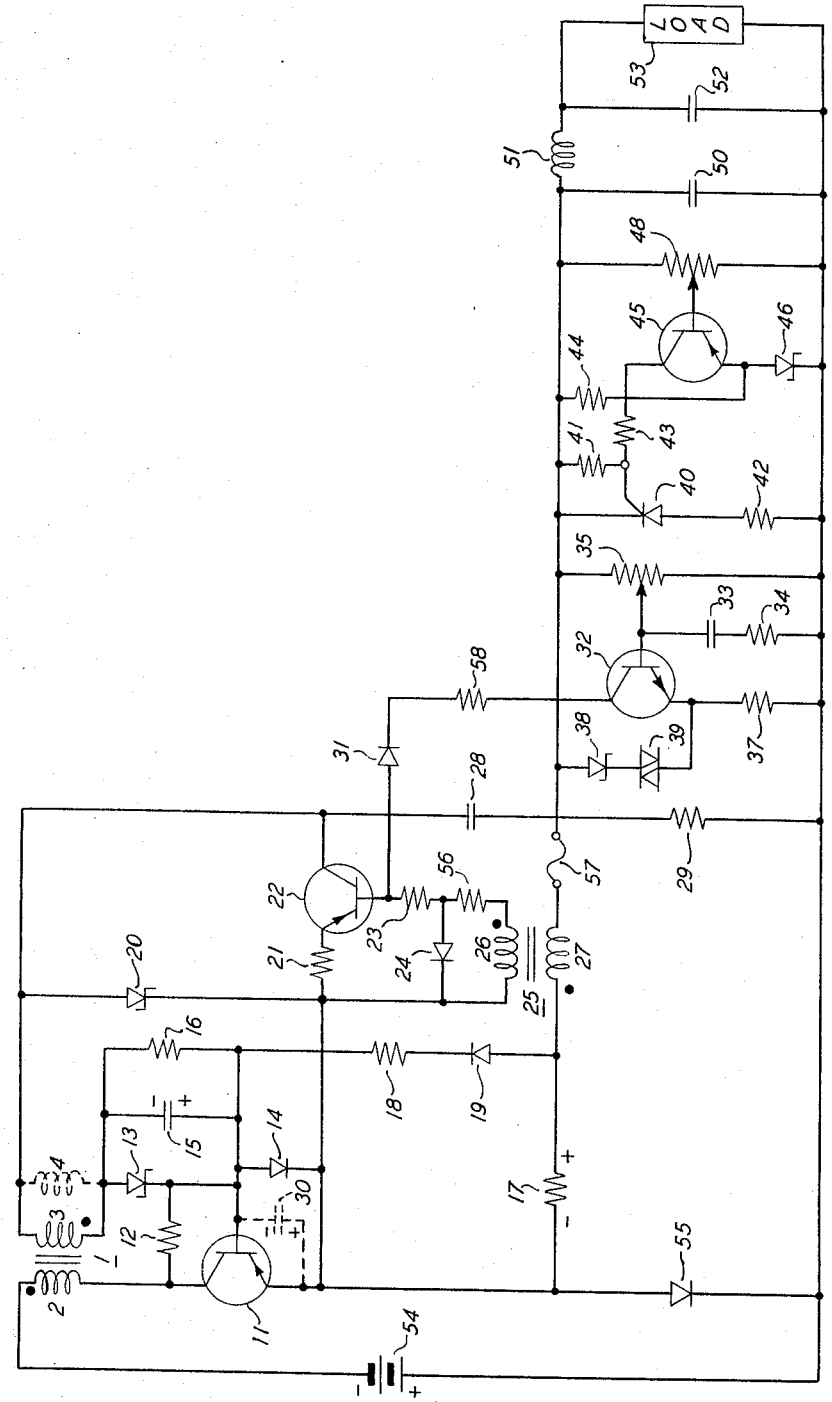

3,304,489
HIGH FREQUENCY SWITCHING REGULATOR
Stephen J. Brolin, Bronx, and George W. Meszaros, New York, N.Y., assignors to Bell Telephone Laboratories, Incorporated, New York, N.Y., a corporation of New York
Filed Apr. 15, 1963, Ser. No. 273,200
6 Claims. (Cl. 323—9)

This invention relates to power supply systems and more particularly to high efficiency systems for controlling the current flow from a source of potential to a load.

The voltage and current regulators of the prior art are numerous. Usually an output voltage controlled regulating impedance element has been serially connected between the source of potential and the load to maintain a constant voltage across the load. The impedance element acts as a current limiting resistor and, accordingly, consumes relatively large amounts of power and requires that special care be taken to remove the heat generated. The efficiencies of such regulators are therefore, even under optimum conditions, severely limited. For example, for a typical telephone power plant requirement of a 21-volt output from a 52-volt input, the efficiency of such a regulator is in the 40 percentile region.

The advent of switching regulators, i.e., circuits wherein regulation is achieved by switching the regulating element between conducting and substantially nonconducting states, has made it possible to achieve theoretically lossless current and voltage regulation. This highly desirable mode of regulation tends, however, to be limited to switching frequencies that require physically large filtering components to remove the switching noise and variations. The size of the filtering components makes it impossible to apply switching regulators to circuits wherein minaturization is a criterion and thus tends to limit the range of applicability of such regulators.

An additional miniaturization limitation is the excessive number of circuit components required for overload protection. These circuits usually employ at least one active element to constantly compare a sample of the load voltage or current to a reference voltage. When the sampled voltage exceeds the reference voltage, the regulating circuit is disabled for the duration of the overload interval. As noted, the sampling, reference, comparing and associated biasing networks require a relatively large number of components and limit applicability of the overload networks.

The switching frequency limitation that has been encountered in the past is due mainly to the inherent limitations of the available regulating elements. There are transistors capable of switching at higher frequencies but the time required to dissipate the storage of charge carriers in a transistor driven from saturation to cutoff limits their upper operating frequencies. The applicability of these transistors is further limited by low inverse base-emitter voltage ratings.

One object of the present invention is, therefore, to eliminate the charge carrier storage time limitation of a regulating transistor capable of high switching frequencies.

Another object is to protect the base-emitter junction of high frequency transistors from inverse voltage damage when they are used in switching regulator applications.

Still another object is to permit important size reduction in a switching regulator with overload protection capabilities.

In accordance with one feature of the present invention, storage time limitations in a transistor switching regulator are overcome by connecting a capacitor in the base-emitter feedback current path of the switching transistor and discharging the energy stored in the capacitor during each conducting interval of the switching transistor to provide an inverse base-emitter current flow. The inverse base-emitter current flow in the switching transistor dissipates stored charge carriers and accelerates termination of each conducting interval, thereby permitting higher switching frequencies to be adopted and smaller filtering components to be used. The necessary reverse current path through the switching transistor is provided by keeping the feedback current path conductive throughout the entire cycle of operation.

In accordance with another feature of the invention, the base-emitter junction of the switching transistor is protected against inverse voltage damage by a diode connected directly between the base and emitter electrodes of that transistor. The diode is poled oppositely to the direction of forward emitter current flow in the switching transistor and limits the inverse voltage which can appear across the base-emitter junction to the forward conduction threshold of the diode.

In accordance with still another feature of the invention, overload protection is provided by a simple diode switch which reverse biases the base-emitter junction of the switching transistor whenever the load current exceeds a predetermined value. Effective overload protection is thereby assured with a minimum number of circuit elements and very little is added to the overall size of the switching regulator.

Other objects and features of the present invention will become apparent upon consideration of the following detailed description when taken in connection with the accompanying drawing, the single figure of which is a schematic diagram of an embodiment of the invention.

In the illustrated embodiment of the invention there is a regulating path which may be traced from the positive terminal of a direct-current source 54, through a load 53, through a filter inductor 51, a fuse 57, the primary winding 27 of a transformer 25, a resistor 17, the emitter-collector path of a regulating transistor 11, a winding 2 of a feedback transformer 1, and back to the negative terminal of direct-current source 54. The base and emitter electrodes of transistor 11 are interconnected in blocking oscillator fashion by parallel network of a Zener diode 13, a capacitor 15, and a resistor 16 connected serially with another winding 3 of transformer 1 and a second Zener diode 20. A resistor 21 and the emitter-collector path of a second transistor 22 are serially connected across Zener diode 20. A diode 14 is connected across the base-emitter path of transistor 11, as is a serially connected overload protection network comprising a pair of resistors 17 and 18 and a diode 19. The base and emitter electrodes of transistor 22 are interconnected by the series combination of a resistor 23, a diode 24 and a resistor 21. A resistor 56 and the secondary winding 26 of transformer 25 are serially connected across diode 24. An "anti-sing" network comprising a serially connected capacitor 28 and resistor 29 is connected from the collector electrode of transistor 22 to the positive terminal of source 54. An energy discharge path for transformer 25 is provided via winding 27, through resistor 17, a flyback diode 55, the load 53, filter inductor 51, and fuse 57. The relative polarities of the windings of transformers 1 and 25 are as indicated by the dots.

In the embodiment of the invention shown, a blocking diode 31 and a current limiting resistor 58 are serially connected from the base electrode of transistor 22 to the collector electrode of transistor 32. A transistor 32 constitutes a conventional error detector which compares the reference voltage across the series combination of a Zener diode 38 and varistor (temperature compensating element) 39 with a portion of the load voltage appearing across a potentiometer 35. The error signal thus derived at the collector electrode of transistor 32 is applied to the base electrode of transistor 22. The series combination of a capacitor 33 and a resistor 34 forms an "anti-hunt" network.

A network comprising a silicon controlled rectifier 40 and a transistor 45 provides overvoltage protection. Controlled rectifier 40 and a resistor 42 are serially connected across the load 53. A bias resistor 41 is connected between the gate and cathode electrodes of controlled rectifier 40, while a current limiting resistor 43 is connected from the gate electrode of controlled rectifier 40 to the collector electrode of transistor 45. Transistor 45 compares the fixed potential across Zener diode 46 to the load potential sampled by potentiometer 48 and thus controls the firing of controlled rectifier 40. Conduction through controlled rectifier 40 causes fuse 57 to open. Inductor 51 and capacitors 50 and 52 form a conventional "pi" low-pass filter.

The operation of the illustrated embodiment of the invention is most easily understood if circuit conditions are examined at initial turn-on, i.e., at the instant the direct-current input potential source 54 is applied to the circuit. At this instant a direct-current path exists from the positive terminal of source 54, through load 53, filter inductor 51, fuse 57, winding 27, resistor 17, the emitter-base path of transistor 11, starting resistor 12, winding 2, and back to the negative terminal of direct-current input source 54. Because of the relative transformer winding polarities, the current flow through winding 2 is such as to induce a voltage in winding 3, negative at the dot. This induced potential is applied to the base of transistor 11 via capacitor 15 to bias transistor 11 into conduction, hence causing more emitter-collector current flow through transistor 11 which results in higher induced voltages in transformer winding 3 and more emitter-base and emitter-collector current flow in typical blocking oscillator regenerative fashion. The turns ratio of transformer 1 is such that transistor 11 is driven almost immediately into saturation. Once its starting function is achieved, resistor 12 may be ignored as far as circuit operation is concerned. It should be noted that the emitter-base current path of transistor 11 comprises the parallel combination of capacitor 15 and resistor 16 serially connected with the winding 3 and Zener diode 20. Zener diode 20 is forward biased by the emitter-base current flow in transistor 11. The emitter-base current flow also charges capacitor 15 in the manner illustrated. Zener diode 13 serves to limit the maximum voltage to which capacitor 15 can charge, thereby ensuring that capacitor 15 will discharge during the nonconductive interval of transistor 11.

As noted heretofore, one of the major limitations of high frequency switching regulation has been the inverse voltage limitations of transistors which are capable of high frequency switching. Such transistors tend to have maximum emitter-base voltage ratings in the neighborhood of 1.5 volts. Since the regenerative transformer winding 3 is connected across the emitter-base path of transistor 11, the inverse voltage induced in this winding would normally be sufficient to destroy transistors capable of high frequency operation. Diode 14, which is connected between the base and emitter electrodes of transistor 11, is forward biased by the inverse voltages and thereby limits the inverse base-emitter voltage to the forward voltage drop of the diode, which is typically approximately 0.5 volt for a germanium diode. The switching transistor 11 may thus be connected directly in the drive and control circuit and yet be protected. The inverse voltages are instead dissipated across the series combination of resistor 21 and the emitter-collector path of transistor 22. The Zener action of diode 20 serves, in turn, to protect these elements.

Dashed winding 4 is shown on the drawing in shunt with transformer winding 3 to represent the effective inductance of transformer 1. Initially, the characteristic of an inductor is that of an open circuit. Hence, all the current initially induced in winding 3 flows through the emitter-base path of transistor 11. As time goes on, however, the inductor tends to absorb more and more of the current induced in winding 3, until eventually all the current induced in winding 3 flows through the equivalent inductance 4. As the current through equivalent inductance 4 increases, the current in the emitter-base path of transistor 11 is accordingly being "starved" on the same basis. At a point in time when essentially all the current induced in winding 3 is flowing through equivalent inductance 4, capacitor 15 discharges and causes an inverse emitter-base current flow through transistor 11. The path of this inverse current flow may be traced from the positive terminal of capacitor 15, through the base-emitter path of transistor 11, through resistor 21, the collector-emitter path of transistor 22, equivalent inductance 4, and back to the negative terminal of capacitor 15. The manner in which transistor 22 is biased into conduction to provide such a current path will be discussed later in more detail. The inverse base-emitter current flow through transistor 11 rapidly cuts off transistor 11 and readies it once again for immediate conduction. A sharp, clean, fast, and efficient switching action is thus obtained, which in turn permits higher switching frequencies.

Turn-off delay in regulating transistor 11 is occasioned by the storage time required to allow the excess charge carriers of the transistor to be consumed. The storage time requirement is most easily understood by assuming that a capacitor is connected across the base-emitter electrodes of the transistor. The dashed capacitor 30, shown connected across the base-emitter electrodes of transistor 11, represents the effect of stored charge carriers in transistor 11. During the conduction interval of transistor 11, capacitor 30 will effectively charge to a potential of the polarity shown. The effect of the energy thus stored in this capacitor is to sustain the current flow in the emitter-base path of transistor 11 after the external bias (i.e., emitter-base current flow), has been "starved" to a negligible value. This effect thus increases the on time (turn-off delay) and limits the frequency of switching, thereby necessitating relatively large filter components. As is readily seen from the foregoing discussion, the discharge of the energy stored in capacitor 15 will overcome the energy effectively stored in capacitor 30 and in addition, provides a cutoff inverse base-emitter current. Sharp turn-off is thus achieved to provide high frequency switching capability. As shall be further apparent from the following discussion this is achieved with a minimum number of components and incorporates the off-time control circuit.

Before discussing the substantial elimination of the storage time requirement of the transistor further, it is desirable to discuss the off-time control provided by transistor 22. As is readily seen, the length of time it takes the energy stored in the core of transformer 1 to dissipate determines the off-time of transistor 11, i.e., the interval in which the circuit from direct-current source 54 to load 53 is broken. The rate of flux dissipation is in turn determined by the impedance in the series loop comprising winding 3, forward-biased Zener diode 13, forward-biased protection diode 14, current limiting resistor 21, and the emitter-collector impedance of transistor 22. The emitter-collector impedance of transistor 22 is in turn controlled by transistor 32.

If the positive potential appearing across the load should increase, the potential across the first parallel path of Zener diode 38, temperature compensating varistor 39, and resistor 37 and the second parallel path of potentiometer 35 will also increase. Since the potential across Zener diode 38 and varistor 39 is essentially constant, the potential at the emitter of transistor 32 is also constant. The base of transistor 32, however, with respect to the emitter, sees that portion of the increase of potential appearing at the variable tap of potentiometer 35. The base of transistor 32 will thus be more positive with respect to the emitter than before due to the change in load potential. The change of load potential therefore results in more collector-emitter current flow through transistor 32. More collector current flow through transistor 32 causes more emitter-base current flow in transistor 22 and a decrease in the emitter-collector impedance of transistor 22. Decreased emitter-collector impedance in transistor 22 increases the interval of time required for the energy stored in the inductance of transformer 1 to dissipate. An increase in the energy dissipation time results in increased off-time of transistor 11 and thus compensates for the increase in load potential. The reverse breakdown characteristic of Zener diode 20 protects transistor 22 from excessive inverse voltages. Once the energy in transformer 1 is dissipated conduction through transistor 11 is again initiated in the manner discussed heretofore.

The potential appearing across winding 27 of transformer 25 induces a potential in winding 26 to provide bias for transistor 22. Transistor 22 is thus biased initially into conduction and, after a short interval, into saturation. The primary purpose of winding 27 is, however, that of filtering and the other advantages obtained are incidental to this function. The bias supplied by winding 26 insures the conduction of transistor 22 during the on-time of transistor 11 and thus provides a path for the discharge of capacitor 15 to eliminate the storage time effects in transistor 11. Once transistor 22 is biased into saturation and its collector-emitter path is an effective short circuit and the transistor is thus capable of passing currents in either direction. Both a portion of the charging and all of the discharging current of capacitor 15 will pass through this path. Resistors 23 and 56 are current limiting resistors. Diode 24 protects the base-emitter junction of transistor 22 from inverse voltages due to the collapsing flux in transformer 25. The flux in transformer 25 collapses when regulating transistor 11 ceases to conduct and the energy stored in transformer 25 forward biases flyback diode 55 into conduction and discharges the energy through load 53. The low-pass "pi" filter comprising filter inductor 51 and capacitors 50 and 52 eliminates the ripple and tends to keep the load voltage constant over the full cycle. Additional windings may be added to transformer 25 to supply additional regulated output voltages, thus adding circuit flexibility in a simple manner.

As discussed, transistor 22, in addition to providing off-time control of regulating transistor 11, is also biased into conduction during the on-time of transistor 11 to provide inverse base-emitter current path through the regulating transistor 11. The additional function represents an improvement over the prior art regulators without the addition of extra components, and in fact, results in the saving of a winding on transformer 1. This is easily seen once it is remembered that a comparable regulator requires three windings rather than two, i.e., a winding such as winding 2 in series with the regulating transistor, an off-time control winding serially connected with the collector and emitter electrodes of the off-time control transistor, and an on-time control winding with fixed circuit parameters connected thereto. The present circuit combines the on- and off-time control functions and by eliminating storage time and inverse voltage limitations, allows the use of regulating transistors capable of providing for switching frequencies many times in excess of those possible by the transistors of the prior art. Additionally, current overload protection is added in a simple and reliable manner.

Another feature of the invention is the simple and reliable current and voltage overload protection provided by the network comprising resistors 17, 18 and diode 19. As can be seen from the drawing, resistor 17 is serially connected in the regulating path, with a voltage drop of the polarity indicated across it due either to the current flow through regulating transistors 11 or the discharge via winding 27 through diode 55 of the energy stored in transformer 25. This voltage drop, in the predetermined range of the regulator, is limited to a magnitude such that diode 19 is normally nonconducting at every instant in the cycle including the instant that the voltage at the base of transistor 11 falls to zero. If, however, the load current or voltage reflected across resistor 17 should rise such that the threshold voltage of diode 19 is exceeded, the diode will be forward biased and a cut-off or reverse potential applied to the emitter-base junction of transistor 11. As soon as transistor 11 is thus biased into cut-off, the energy stored in transformer 25 is discharged to the load through diode 55. But, as noted, resistor 17 constantly monitors this current as well as the current through the collector-emitter path of transistor 11. When the energy stored in transformer 25 diminishes with time, the load current, which is dependent on this energy, also diminishes and the overcurrent condition is eliminated. The voltage drop across resistor 17 then falls until diode 19 is no longer forward-biased and the reverse-bias across the base-emitter junction of transistor 11 is removed, allowing transistor 11 to be once again biased into conduction. It should be noted that the circuit is thus protected without the necessity of a circuit disabling device such as a fuse.

In the event of a shorted output, the energy stored in transformer 25, and thus the load current, oscillates between a low and high level. In the manner described in connection with the overcurrent condition, the network comprising resistors 17, 18, and diode 19 protects transistor 11 against damage due to a shorted output without the necessity of a fuse. If the additional protection provided by a fuse were desired, however, the protection network would serve the function of protecting transistor 11 until the time lag inherent in fuse 57 has expired and the fuse blows. In the absence of resistors 17, 18 and diode 19, the fuse 57 would not be fast enough to protect transistor 11. This network thus protects the regulating transistor not only under shorted load conditions, but also from transient conditions which disappear before the fuse has had time to blow. Protection is thus added simply and reliably without the need for Zener reference diodes, transistors, and separate biasing networks.

In addition to the current overload protection, the illustrated embodiment of the invention features overvoltage protection provided by the network comprising silicon controlled rectifier 40, resistors 41, 42, 43, and 44, transistor 45, Zener diode 46, and potentiometer 48. Zener diode 46, which is serially connected across the load with resistor 44 is constantly broken down in the inverse voltage direction by the load voltage. A portion of the load voltage is sampled by the wiper arm of potentiometer 48, applied at the base electrode of transistor 45 and compared to the constant emitter potential of Zener diode 46. When the portion of the load voltage exceeds the breakdown voltage of Zener diode 46, transistor 45 conducts and a voltage pulse appears across both resistor 41 and between the gate and cathode electrodes of silicon controlled rectifier 40. Controlled rectifier 40 is thus biased into conduction. Conduction through controlled rectifier 40 immediately places a low impedance across the load and reduces the output voltage to almost zero volts. As determined by the relative values of the circuit parameters, under heavy overload conditions fuse 57 may blow. The firing voltage of controlled rectifier 40 may be easily and accurately adjusted by varying the wiper arm of potentiometer 48. Since this overvoltage protection network contains only semiconductor components, it possesses the inherent qualities of speed and reliability.

The above-described arrangement is illustrative of the application of the principles of the invention. Other embodiments may be devised by those skilled in the art without departing from the spirit and scope of the invention.

What is claimed is:
1. A high speed switching regulator which comprises a source of direct potential, a load, a regulating transistor having its emitter and collector electrodes serially connected with said source of direct potential and said load sponsive to load voltage variations, and biasing means to interrupt the flow of current from said source to said load, a serially connected switching control network comprising energy storage means and a control element connected to the base and emitter electrodes of said regulating transistor to switch the emitter-collector and emitter-base paths of said regulating transistor between conductive and nonconductive states, means connecting said control element to said load to render said control element responsive to load voltage variations, and biasing means connected to said control element to bias said control element into conduction during the conductive interval of said regulating transistor, said control element providing a conductive reverse current path through the base-emitter path of said regulating transistor for the energy stored in said energy storage means whereby each transition of said regulating transistor from a conductive to a nonconductive state is initiated.

2. A high speed switching regulator in accordance with claim 1 which includes a diode connected between the base and emitter electrodes of said regulating transistor and poles to conduct during the interval that the base-emitter path of said regulating transistor is nonconductive to protect the base-emitter junction of said transistor from inverse voltages of a magnitude sufficient to damage a regulating transistor capable of high frequency operation.

3. A high speed switching regulator in accordance with claim 1 which includes load current variation responsive means serially connected between the emitter electrode of said regulating transistor and said load, a diode having a first terminal connected to the base electrode of said regulating transistor, and means connecting the second terminal of said diode to said load current variation responsive means to initiate forward conduction through said diode whenever the load current exceeds a predetermined value, whereby said regulating transistor is rendered nonconductive for the interval that the load current exceeds said predetermined value.

4. A high speed switching voltage regulator comprising a source of input potential, a load, regulating and control transistors each having base, collector, and emitter electrodes, means serially connecting said input source, the emitter and collector electrodes of said regulating transistor, and said load, a serially connected regenerative feedback network comprising at least a capacitor and the emitter and collector electrodes of said control transistor connected to the base and emitter electrodes of said regulating transistor to switch said regulating transistor between conductive and nonconductive states, an error detector connected to said load and the base electrode of said control transistor to control the emitter-collector impedance of said control transistor and the duration of the nonconductive interval of said regulating transistor in accordance with load voltage variations, and biasing means connected to the base and emitter electrodes of said control transistor to maintain conductivity through the collector-emitter path of said control transistor during the conductive interval of said regulating transistor, whereby a low impedance discharge path is provided for said capacitor during the conductive interval of said regulating transistor.

5. A high speed switching voltage regulator which comprises a source of direct potential, a load, regulating and control transistors each having base, collector, and emitter electrodes, load current responsive means, means serially connecting said input source, the emitter and collector electrodes of said regulating transistor, said load current responsive means, and said load, a serially connected regenerative feedback network comprising at least a capacitor and the emitter and collector electrodes of said control transistor connected to the base and emitter electrodes of said regulating transistor to switch said regulating transistor between conductive and nonconductive states, an error detector connected to said load and the base electrode of said control transistor to control the emitter-collector impedance of said control transistor and the duration of the nonconductive interval of said regulating transistor in accordance with load voltage variations, and means connecting said load current responsive means to the base and emitter electrodes of said control transistor to maintain conductivity through the emitter-collector path of said control transistor during the conductive interval of said regulating transistor, whereby a low impedance discharge path is provided for said capacitor during the conductive interval of said regulating transistor.

6. A high speed switching regulator in accordance with claim 5 which includes a resistor serially connected between the emitter electrode of said regulating transistor and said load current responsive means in the serial path comprising said input source, the emitter and collector electrodes of said regulator transistor, said load current responsive means, and said load, and a diode serially connected with said resistor and the emitter and base electrodes of said regulating transistor and poled to apply the potential across said resistor to the emitter and base electrodes of said regulating transistor to terminate conduction through said regulating transistor in the event of a current overload conduction.

References Cited by the Examiner
UNITED STATES PATENTS

| | | | |
|---|---|---|---|
| 2,912,638 | 11/1959 | McNamee | 323—22 |
| 3,096,475 | 7/1963 | Brooks | 323—22 |
| 3,115,600 | 12/1963 | Brolin | 323—22 |
| 3,174,094 | 3/1965 | Farnsworth et al. | 323—18 |
| 3,177,402 | 4/1965 | Muchnick et al. | 323—22 X |

JOHN F. COUCH, *Primary Examiner.*

W. E. RAY, *Assistant Examiner.*